United States Patent
Xiong (10) Patent No.: US 10,098,202 B1
(45) Date of Patent: Oct. 9, 2018

(54) CONSTANT CURRENT SOURCE WITH OUTPUT VOLTAGE RANGE AND SELF-CLAMPING OUTPUT VOLTAGE

(71) Applicant: Universal Lighting Technologies, Inc., Madison, AL (US)

(72) Inventor: Wei Xiong, Madison, AL (US)

(73) Assignee: Universal Lighting Technologies, Madison, AL (US)

( * ) Notice: Subject to any disclaimer, the term of this patent is extended or adjusted under 35 U.S.C. 154(b) by 813 days.

(21) Appl. No.: 13/846,984

(22) Filed: Mar. 19, 2013

Related U.S. Application Data (60) Provisional application No. 61/612,554, filed on Mar. 19, 2012.

(51) Int. Cl.
*H05B 37/02* (2006.01)
*H05B 33/08* (2006.01)

(52) U.S. Cl.
CPC ......... *H05B 37/02* (2013.01); *H05B 33/0815* (2013.01); *H05B 33/0845* (2013.01)

(58) Field of Classification Search
CPC ............ H05B 33/0815; H05B 33/0836; H05B 33/0839; H05B 33/0845
USPC .................. 315/224–226, 276–278, 291, 308
See application file for complete search history.

(56) References Cited

U.S. PATENT DOCUMENTS

| | | | | |
|---|---|---|---|---|
| 6,304,039 B1 * | 10/2001 | Appelberg et al. | ........ | 315/169.3 |
| 7,990,070 B2 * | 8/2011 | Nerone | .................... | H02M 1/32 315/224 |
| 8,008,902 B2 * | 8/2011 | Melanson et al. | ............ | 323/285 |
| 8,525,428 B2 * | 9/2013 | Chen et al. | .................... | 315/219 |
| 8,664,878 B2 * | 3/2014 | Choudhury | ........ | H05B 41/2855 315/206 |
| 8,699,244 B1 * | 4/2014 | Xiong | ............. | 363/37 |
| 8,723,428 B2 * | 5/2014 | Yao | ..................... | H05B 33/0815 315/177 |
| 8,836,228 B2 * | 9/2014 | Xu et al. | ........................ | 315/219 |
| 8,841,863 B2 * | 9/2014 | Ido | ..................... | H05B 33/0818 315/291 |
| 8,847,512 B1 * | 9/2014 | Xiong | ........................ | 315/307 |
| 8,890,424 B2 * | 11/2014 | Xu et al. | ........................ | 315/192 |
| 2005/0029966 A1 * | 2/2005 | Buonocunto | ........... | H02J 9/065 315/291 |

\* cited by examiner

*Primary Examiner* — Thuy Vinh Tran
(74) *Attorney, Agent, or Firm* — Patterson Intellectual Property Law, P.C.; Gary L. Montle (57) ABSTRACT

A driver circuit of a light fixture includes a half-bridge inverter, a resonant tank circuit, an isolating transformer, an output rectifier, and a controller. The half-bridge inverter provides an alternating current signal to the resonant tank circuit. The resonant tank circuit includes a resonant inductor, a resonant capacitor, a first clamping diode, and a second clamping diode. The clamping diodes limit the voltage of the resonant capacitor to a power rail voltage and a ground voltage. The isolating transformer is connected to the resonant tank circuit. The controller senses current provided to the light source and adjusts a switching frequency of the half-bridge inverter to maintain the sensed current at a target current. The driver circuit operates as a constant current source with a self-limited output voltage determined as a function of the voltage of the power rail and the turns ration of the isolating transformer.

18 Claims, 3 Drawing Sheets

CONSTANT CURRENT SOURCE WITH OUTPUT VOLTAGE RANGE AND SELF-CLAMPING OUTPUT VOLTAGE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: U.S. Provisional Patent Application No. 61/612,554, filed Mar. 19, 2012, entitled "Constant Current Source with Wide Output Voltage Range and Self-Clamping Output Voltage."

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to light source driver circuits. More particularly, the invention relates to current source based driver circuits for LED lighting.

Light emitting diode (LED) lighting is growing in popularity due to decreasing costs and long life compared to incandescent lighting and fluorescent lighting. LED lighting can also be dimmed without impairing the useful life of the LED light source.

Isolated constant current source topologies that are commonly used in light source (e.g., LED) driver circuits include flyback converters, forward converters, LLC converters, and half-bridge isolated buck converters. Flyback converters and forward converters have low efficiency and require the use of high-voltage MOSFET devices. LLC converters have insufficient output voltage range, and the output is not self-limiting. Half-bridge isolated buck converters require hard switching of the MOSFET devices, have low efficiency, require complicated controllers, and the output is not self-limiting.

There is a particular CLASS-2 LED driver defined in Underwriters Laboratories specifications. The specification requires the driver to be isolated and have a maximum output voltage less than 60 volts DC. If a maximum voltage of a load (e.g., a light source such as an LED string) is close to 60 volts, then limiting the output voltage to 60 volts by operation of the control loop in the driver circuit is difficult because control loops inherently have over-shoot and delay.

An LED driver circuit should be capable of driving different loads that have different numbers of LEDs. Thus, the LED driver has to be capable of a wide range of output voltages while maintaining control of the output current. A driver circuit with dimming capability, self-limited output voltage, and a wide output voltage range is thus desirable.

BRIEF SUMMARY OF THE INVENTION

In one aspect, a driver circuit according to the present invention is operable to provide current to a light source from a direct current (DC) power source having a power rail and a ground rail. The driver circuit includes a half-bridge inverter, a resonant tank circuit, an isolating transformer, an output rectifier, and a controller. The half-bridge inverter has an input and an output. The input couples the power rail and the ground of the DC power source. The half-bridge inverter is operable to provide an alternating current (AC) signal at the output. The resonant tank circuit includes a resonant inductor, a resonant capacitor, a first clamping diode, and a second clamping diode. The resonant tank circuit has an input connected to the output of the half-bridge inverter and an output. The resonant capacitor is connected in series with the resonant inductor between the output of the half-bridge inverter and the ground of the DC power source. The first clamping diode has an anode connected to a junction between the resonant inductor and the resonant capacitor and a cathode connected to the power rail of the DC power source. The second clamping diode has an anode connected to the ground of the DC power source and a cathode connected to the junction between the resonant capacitor and the resonant inductor. The isolating transformer is connected to the output of the resonant tank circuit. The isolating transformer includes a primary winding and a secondary winding. The primary winding is connected between the output of the resonant tank circuit and the ground of the DC power source. The output rectifier has an input connected to the secondary winding of the isolating transformer and an output operable to connect to the light source. The controller is operable to sense current provided to the light source from the output rectifier and adjust a switching frequency of the half-bridge inverter as a function of the sensed current to maintain the sensed current at a target current.

In another aspect, the present invention is a ballast is operable to provide power to a light source from an alternating current (AC) power source. The ballast includes an input rectifier and a driver circuit. The input rectifier is operable to connect to the AC power source and provide a direct current (DC) power source having a power rail and ground rail at an output of the input rectifier. The driver circuit is operable to provide current to the light source from the DC power source. The driver circuit includes a half-bridge inverter, a resonant tank circuit, an isolating transformer, an output rectifier, and a controller. The half-bridge inverter has an input and an output, and the input is connected to the power rail and the ground of the DC power source. The half-bridge inverter is operable to provide an alternating current (AC) signal at the output. The resonant tank circuit includes a resonant inductor, a resonant capacitor, a first clamping diode, and a second clamping diode. The resonant tank circuit has an input connected to the output of the half-bridge inverter and an output. The resonant capacitor is connected in series with the resonant inductor between the output of the half-bridge inverter and the ground of the DC power source. The first clamping diode has an anode connected to a junction between the resonant inductor and the resonant capacitor and a cathode connected to the power rail of the DC power source. The second clamping diode has an anode connected to the ground of the DC power source and a cathode connected to the junction between the resonant capacitor and the resonant inductor. The isolating transformer is connected to the output of the resonant tank circuit. The isolating transformer includes a primary winding and a secondary winding. The primary winding is connected between the output of the resonant tank circuit and the ground of the DC power source. The output rectifier has an input connected to the secondary winding of the isolating transformer and an output operable to connect to the light source. The controller is operable to sense current provided to the light source from the output rectifier and adjust a switching frequency of the half-bridge inverter as a function of the sensed current to maintain the sensed current at a target current.

In a further aspect, the present invention is a light fixture is operable to receive power from an AC power source and provide light. The light fixture includes a light source, a ballast, and a housing. The light source is operable to provide light in response to receiving current. The housing is connected to the ballast and the light source. The ballast is operable to provide current to the light source from the alternating current (AC) power source. The ballast includes an input rectifier and a driver circuit. The input rectifier is operable to connect to the AC power source and provide a direct current (DC) power source having a power rail and ground rail at an output of the input rectifier. The driver circuit is operable to provide current to the light source from the DC power source. The driver circuit includes a half-bridge inverter, a resonant tank circuit, an isolating transformer, an output rectifier, and a controller. The half-bridge inverter has an input and an output, and the input is connected to the power rail and the ground of the DC power source. The half-bridge inverter is operable to provide an alternating current signal at the output. The resonant tank circuit includes a resonant inductor, a resonant capacitor, a first clamping diode, and a second clamping diode. The resonant tank circuit has an input connected to the output of the half-bridge inverter and an output. The resonant capacitor is connected in series with the resonant inductor between the output of the half-bridge inverter and the ground of the DC power source. The first clamping diode has an anode connected to a junction between the resonant inductor and the resonant capacitor and a cathode connected to the power rail of the DC power source. The second clamping diode has an anode connected to the ground of the DC power source and a cathode connected to the junction between the resonant capacitor and the resonant inductor. The isolating transformer is connected to the output of the resonant tank circuit. The isolating transformer includes a primary winding and a secondary winding. The primary winding is connected between the output of the resonant tank circuit and the ground of the DC power source. The output rectifier has an input connected to the secondary winding of the isolating transformer and an output operable to connect to the light source. The controller is operable to sense current provided to the light source from the output rectifier and adjust a switching frequency of the half-bridge inverter as a function of the sensed current to maintain the sensed current at a target current.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" refers to any circuit for providing power from a power source to a light source. Additionally, "light source" refers to one or more light emitting devices such as fluorescent lamps, high intensity discharge lamps, incandescent bulbs, and solid state light-emitting elements such as LEDs, organic light emitting diodes, and plasmaloids.

Figure 1:
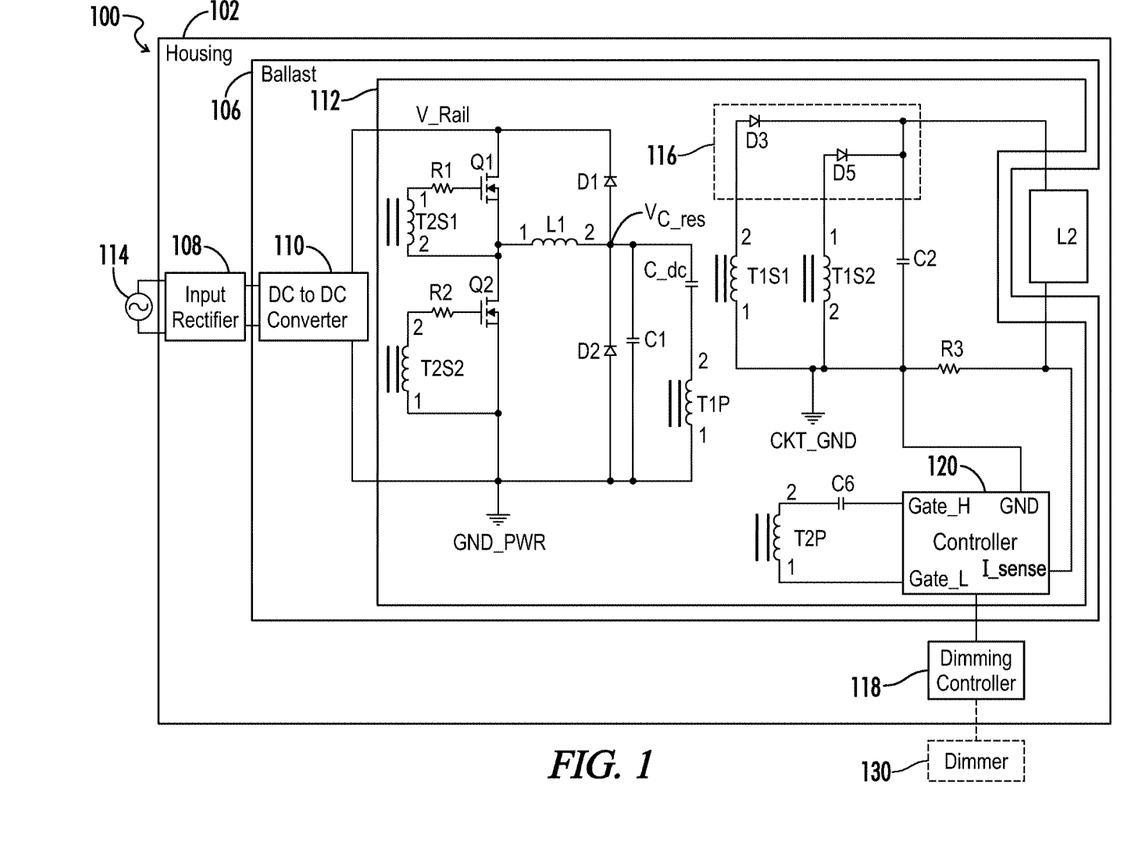
FIG. 1 is a block diagram and partial schematic diagram of a light fixture including a light source and a ballast.

Referring to FIG. 1, a light fixture 100 includes a housing 102, a ballast 106 and a light source L2. The light fixture 100 receives power from an alternating current (AC) power source 114 and provides light from the light source L2. The light source L2 provides light in response to receiving current. The housing 102 is connected to the ballast 106 and the light source L2. In one embodiment, the housing 102 supports the ballast 106 and the light source L2 in a predetermined spatial relationship. In one embodiment, the light source L2 is a plurality of series and parallel connected light emitting diodes. In one embodiment, the light fixture 100 also includes a dimming circuit operable to provide a dimming signal to a controller 120 of the ballast 106. The dimming signal is indicative of a target current or light intensity level for the light source L2.

The ballast 106 is operable to provide current to the light source L2 from the AC power source 114. The ballast 106 includes an input rectifier 108 and a driver circuit 112. The input rectifier 108 is operable to connect to the AC power source 114 and provide a DC power source having a power rail V_RAIL and a ground GND_PWR at an output of the input rectifier 108. In one embodiment, the ballast 106 also includes a DC-to-DC converter 110 connected between the input rectifier 108 and the driver circuit 112. The DC-to-DC converter 110 is operable to alter a voltage of a power rail V_RAIL of a DC power source provided by the input rectifier 108. The driver circuit 112 is operable to provide current to the light source L2 from the DC power source provided by the input rectifier 108.

The driver circuit 112 includes a half-bridge inverter, a resonant tank circuit, an isolating transformer, an output rectifier 116, and a controller 120. The driver circuit 112 provides a self-limiting output voltage, has relatively high efficiency, is capable of dimmed operation, and has a wide output voltage operating range. The driver circuit 112 operates as a constant current source with a self-limiting output voltage. The driver circuit 112 is optionally dimmable such that the constant current can be changed. The half-bridge inverter includes a first switch Q1 (i.e., a high side switch) and a second switch Q2 (i.e., a low side switch) and has an input and an output. The input of the half-bridge inverter is operable to connect to the power rail V_RAIL and the ground PWR_GND of the DC power source and provide an AC signal at the output of the half-bridge inverter. In one embodiment, the input of the half-bridge inverter is a high side of the high side switch, and a low side of the low side switch (e.g., second switch Q2) is operable to connect to the ground of the DC power source.

The resonant tank circuit includes a resonant inductor L1, a resonant capacitor C1, a first clamping diode D1, and a second clamping diode D2. The resonant tank circuit has an input and an output. The input of the resonant tank circuit (e.g., a first terminal of a resonant inductor L1) is connected to the output of the half-bridge inverter. The resonant capacitor C1 is connected in series with the resonant inductor L1 between the output of the half-bridge inverter and the ground GND_PWR of the DC power source. The first clamping diode D1 has an anode connected to a junction formed at the connection between the resonant inductor L1 and a resonant capacitor C1. The cathode of the first clamping diode D1 is connected to the power rail V_RAIL of the DC power source. The second clamping diode D2 has an anode connected to the ground PWR_GND of the DC power source and a cathode connected to the junction between the resonant capacitor C1 and the resonant inductor L1. In one embodiment, the resonant tank circuit includes a DC blocking capacitor C_DC connected between the junction of the resonant inductor L1 and resonant capacitor C1 and the output of the resonant tank circuit. The first clamping diode D1 and the second clamping diode D2 cooperate to limit the voltage at the junction between the resonant inductor L1 and a resonant capacitor C1 to a maximum voltage equal to the voltage of the power rail V_RAIL of the DC power source and a minimum voltage equal to the ground PWR_GND of the DC power source.

An isolating transformer is connected to the output of the resonant tank circuit. The isolating transformer includes a primary winding T1P and a secondary winding T1S1, T1S2. The primary winding T1P is connected between the output of the resonant tank circuit and the ground PWR_GND of the DC power source. The output rectifier 116 has an input connected to the secondary winding T1S1, T1S2 of the isolating transformer and an output operable to connect to the light source L2. In one embodiment, the turns ratio of the isolating transformer is selected as a function of a voltage of the power rail V_RAIL of the DC power source and a predetermined output voltage limit. In one embodiment, the output voltage limit is 60 VDC.

The controller 120 is operable to sense current provided to the light source L2 from the output rectifier 116 and to adjust a switching frequency of the half-bridge inverter as a function of the sensed current to maintain the sensed current at a target current. In one embodiment, the target current is determined as a function of the dimming signal provided by the dimming controller 118. The controller 120 is further operable to control the current provided to the light source L2 as a function of the received dimming signal by adjusting the target current as a function of the received dimming signal. In one embodiment, the controller 120 adjusts the current provided to the light source L2 by adjusting a switching frequency of the half-bridge inverter.

In one embodiment, the secondary winding T1S1, T1S2 of the isolating transformer is connected to a circuit ground CKT_GND which is isolated from the ground PWR_GND of the DC power source by the isolating transformer. Specifically, the secondary winding includes first secondary winding T1S1 and second secondary winding T1S2, each connected to the circuit ground CKT_GND. The first secondary winding T1S1 and the second secondary winding T1S2 are connected out of phase with one another.

The output rectifier includes a first output diode D3 and a second output diode D5. The first output diode D3 has its anode connected to the first secondary winding T1S1 and a cathode coupled to the light source L2 (i.e., an output of the driver circuit 112 and ballast 106). The second output diode D5 has an anode connected to the second secondary winding T1S2 and a cathode coupled to the light source L2 (i.e., the output of the driver circuit 112 and ballast 106).

In one embodiment, an output capacitor C2 is connected between the output of the output rectifier 116 and the circuit ground CKT_GND to smooth or stabilize the output voltage of the driver circuit 112 and ballast 106. In one embodiment, a current sensing resistor R3 is connected between the circuit ground CKT_GND and the light source L2. A first terminal of the current sensing resistor R3 is connected to the circuit ground CKT_GND, and a second terminal of the current sensing resistor is operable to connect to the light source L2. Thus, a voltage across the current sensing resistor is proportional to a current through the light source L2. The controller 120 is connected to the circuit ground CKT_GND and the second terminal of the current sensing resistor R3 to monitor the voltage across the current sensing resistor and sense the current provided to the light source L2 by the ballast 106.

In one embodiment, the driver circuit 112 further includes a gate drive transformer. The gate drive transformer is operable to receive the gate drive signal from the controller 120 which controls the switching frequency of the half-bridge inverter. The gate drive transformer includes a primary winding T2P a first secondary winding T2S1, and a second secondary winding T2S2. In this embodiment, the first switch Q1 and the second switch Q2 of the half-bridge inverter each have a high terminal, a low terminal, and a control terminal. The high terminal of the first switch Q1 is connected to the power rail V_RAIL of the DC power source. The low terminal of the second switch Q2 is connected to the ground PWR_GND of the DC power source. The high terminal of the second switch Q2 is connected to the low terminal of the first switch Q1. A gate drive capacitor C6 is connected in series with the primary winding T2P of the gate drive transformer across a gate drive output (i.e., gate_H and gate_L) of the controller 120. A first gate drive resistor R1 is connected in series with the first secondary winding T2S1 of the gate drive transformer between the control terminal of the first switch Q1 and the output of the half-bridge inverter. A second gate drive resistor R2 is connected in series with the second secondary winding T2S2 of the gate drive transformer between the control terminal of the second switch Q2 and the ground PWR_GND of the DC power circuit. The polarity of the first secondary winding T2S1 and the second secondary winding T2S2 of the gate drive transformer are opposites such that the first switch Q1 and the second switch Q2 are driven out of phase by the gate drive transformer.

Figure 2:
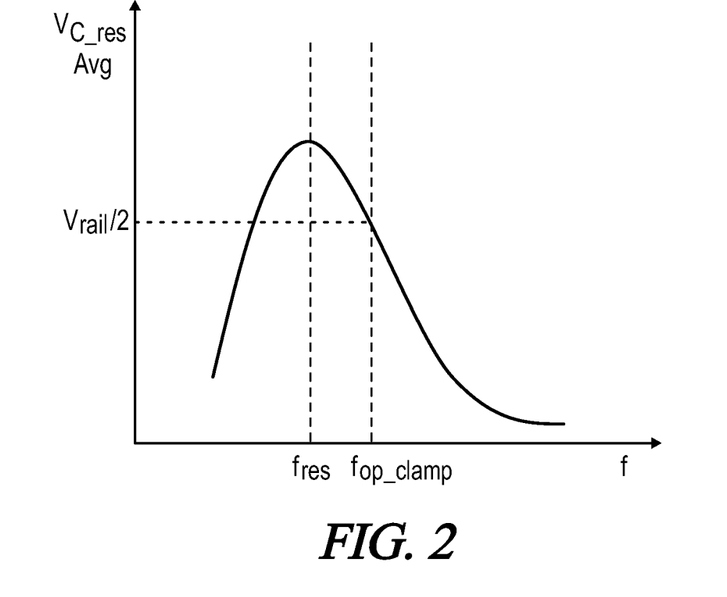
FIG. 2 is a graphical plot of average voltage of the resonant capacitor versus frequency of the half-bridge inverter for a driver circuit topology that does not include clamping diodes.

Referring to FIG. 2, a plot of average resonant capacitor voltage $V_{C\_res}$ versus frequency is shown for a driver circuit topology that does not include the first clamping diode D1 and the second clamping diode D2. Because the voltage $V_{C\_res}$ of the resonant capacitor C1 is not clamped or limited, the voltage $V_{C\_res}$ of the resonant capacitor C1 can be much greater than one-half the voltage of the power rail V_RAIL of the DC power source.

In contrast, in the driver circuit 112 which includes the first clamping diode D1 and the second clamping diode D2, the average voltage $V_{C\_res}$ of the resonant capacitor C1 is clamped at one-half the voltage of the power rail V_RAIL (i.e., V_RAIL/2 in FIG. 3), regardless of the operating (i.e., switching) frequency of the half-bridge inverter because the instantaneous voltage of the resonant capacitor is clamped at the voltage of the power rail V_RAIL. The maximum frequency at which the first clamping diode D1 and the second clamping diode D2 limit the voltage of the resonant capacitor C1 is the clamping frequency $f_{op\_clamp}$. Above the clamping frequency $f_{op\_clamp}$, the average voltage of the resonant capacitor C1 is less than V_RAIL/2.

Thus, when the operating frequency (i.e., switching frequency) of the half-bridge inverter is less than the clamping frequency $f_{op\_clamp}$, the voltage $V_{C\_res}$ of the resonant capacitor C1 is still limited to one half the voltage of the power rail V_RAIL. So even when the switching frequency is at the resonant frequency $f_{res}$ of the resonant tank, the average voltage $V_{C\_res}$ across the resonant capacitor C1 will be limited to one half the voltage of the power rail V_RAIL, but reducing the frequency below the clamping frequency $f_{op\_clamp}$ (e.g., to the resonant frequency $f_{res}$ of the resonant tank circuit) can provide more current to the primary winding T1S1 of the isolating transformer. The driver circuit 112 can thus provide additional current to the light source L2 without increasing the output voltage of the driver circuit 112 by decreasing the operating frequency of the half-bridge inverter.

Figure 3:
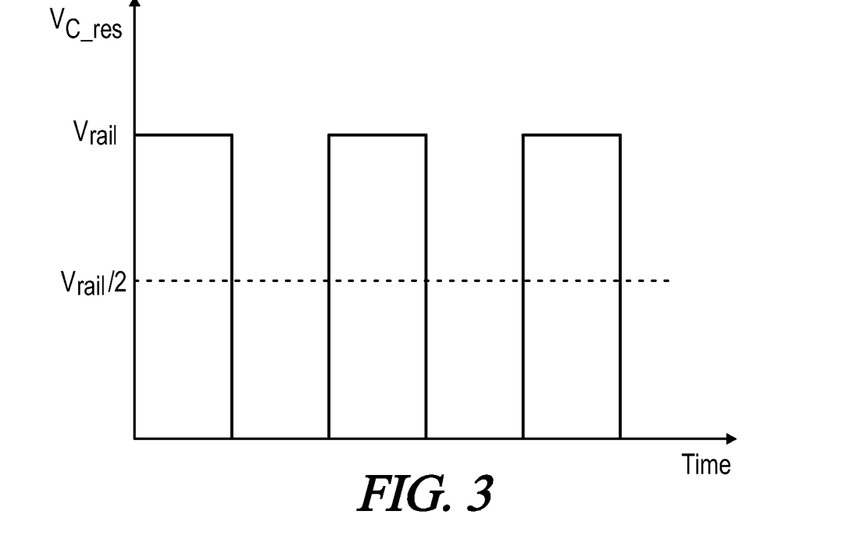
FIG. 3 is a plot of voltage of the resonant capacitor versus time for a switching frequency of the half-bridge inverter that is less than the resonant frequency of the resonant tank circuit.
Figure 4:
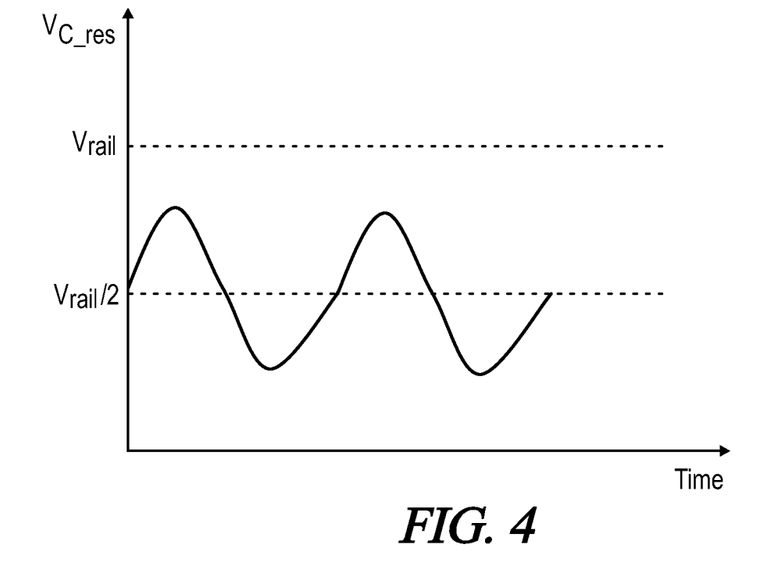
FIG. 4 is a plot of voltage of the resonant capacitor versus time for a switching frequency of the half-bridge inverter that is greater than the resonant frequency of the resonant tank circuit.

Referring to FIG. 3, the voltage waveform for the resonant capacitor C1 is shown for an operating frequency that is less than the resonant frequency $f_{res}$ of the resonant tank circuit. Referring to FIG. 4, the voltage waveform for the resonant capacitor C1 is shown for an operating frequency that is greater than the resonant frequency $f_{res}$ of the resonant tank circuit.

Because the maximum voltage across the resonant capacitor C1 is clamped, the maximum peak voltage across the isolating transformer primary winding T1S1 is also clamped. Thus, if the turns ratio N of the isolating transformer is selected such that $$N = \frac{V\_RAIL}{2} * \frac{1}{60},$$

then the secondary winding voltage of the isolating transformer will never exceed 60 Volts (i.e., the UL Class-2 limit). The half-bridge inverter and the resonant tank circuit is thus a voltage source with a self-clamped output voltage.

Further, because the voltage $V_{C\_res}$ across the resonant capacitor C1 is limited to V_RAIL/2, the half-bridge inverter that drives the resonant tank circuit will always operate in a soft-switching condition. This reduces the switching losses and increases the efficiency of the driver circuit 112.

Referring again to FIG. 2, the voltage $V_{C\_res}$ across the resonant capacitor C1 can vary between V_RAIL/2 and 0 volts. The driver circuit 112 can thus drive any light source L2 (e.g., any LED configuration) from the predetermined maximum output voltage (e.g., 60 volts) to the minimum voltage (i.e., 0 volts).

In one embodiment, the driver circuit 112 includes a series resonant inverter that has a self-limited output voltage. The series resonant inverter exhibits half-bridge soft-switching under all operating conditions. The driver circuit 112 operates as a constant current source that has a self-limited output voltage. The driver circuit 112 operates as a constant current source that has a wide output voltage operating range. The driver circuit 112 can be controlled by an external reference signal (i.e., a dimming signal from a dimmer 130 interfacing with the dimming controller 118) to provide a dimming function.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, circuits, and controllers described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as hard coding, computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A driver circuit operable to provide current to a light source from a direct current (DC) power source having a power rail and a ground, the driver circuit comprising:
    first and second switches coupled in series between the power rail and the ground of the DC power source;
    a resonant circuit comprising one resonant inductor and one resonant capacitor coupled in series on a first end to a node between the first and second switches and on a second end to the ground of the DC power source;
    a first clamping diode having an anode connected to a junction between the resonant inductor and the resonant capacitor and a cathode connected to the power rail of the DC power source;
    a second clamping diode having an anode connected to the ground of the DC power source and a cathode connected to the junction between the resonant capacitor and the resonant inductor;
    an isolating transformer comprising a primary winding coupled in parallel with the resonant capacitor, and a secondary winding;
    an output rectifier having an input connected to the secondary winding of the isolating transformer and an output operable to connect to the light source; and
    a controller operable to sense a current provided to the light source from the output rectifier and adjust a switching frequency of the first and second switches as a function of the sensed current to maintain the sensed current at a target current,
    wherein the controller is connected to a dimming circuit and configured to receive a dimming signal from the dimming circuit, and
    wherein the controller is operable to control the current provided to the light source as a function of the received dimming signal by adjusting the target current as a function of the received dimming signal.

2. The driver circuit of claim 1, further comprising:
    a circuit ground, wherein the circuit ground is isolated from the ground of the DC power source;
    a current sensing resistor having a first terminal connected to the circuit ground and a second terminal operable to connect to the light source, wherein a voltage across the current sensing resistor is proportional to a current through the light source; and
    wherein the controller is connected to the circuit ground and the second terminal of the current sensing resistor to monitor the voltage across the current sensing resistor and sense the current provided to the light source.

3. The driver circuit of claim 1, wherein the resonant tank circuit further comprises a DC blocking capacitor coupled in series with the primary winding of the isolating transformer.

4. The driver circuit of claim 1, wherein the driver circuit further comprises an output capacitor connected between an output of the output rectifier and the circuit ground; and
    the output capacitor is operable to stabilize a voltage provided to the light source by the driver circuit.

5. The driver circuit of claim 1, wherein:
    the first switch comprises a high terminal, a low terminal, and a control terminal, wherein the high terminal is connected to the power rail of the DC power source,
    the second switch comprises a high terminal, a low terminal, and a control terminal, wherein the low terminal is connected to the ground of the DC power source,
    the high terminal of the second switch is connected to the low terminal of the first switch; and
    the driver circuit further comprises
        a gate drive transformer configured to receive a gate drive signal from the controller, the gate drive signal controlling the switching frequency of the first and second switches, the gate drive transformer comprising a primary winding, a first secondary winding, and a second secondary winding,
        a gate drive capacitor connected in series with the primary winding of the gate drive transformer across a gate drive output of the controller,
        a first gate drive resistor connected in series with the first secondary winding of the gate drive transformer,
        a second gate drive resistor connected in series with the second secondary winding of the gate drive transformer, and
        wherein the polarity of the first secondary winding and the second secondary winding of the gate drive transformer are opposite such that the first switch and second switch are driven out of phase by the gate drive transformer.

6. The driver circuit of claim 1, wherein the dimming circuit is interfaced with an external dimmer to receive an external reference signal.

7. The driver circuit of claim 1, wherein the first and second clamping diodes are effective to limit an alternating current (AC) component of the voltage at the junction between the resonant inductor and the resonant capacitor to a maximum of one half of a voltage of the power rail of the DC power source and a minimum of a voltage of the ground of the DC power source.

8. The driver circuit of claim 7, wherein a turns ratio of the isolating transformer is selected as a function of a voltage of the power rail of the DC power source and a predetermined output voltage limit.

9. A driver circuit operable to provide current to a light source from a direct current (DC) power source having a power rail and a ground, the driver circuit comprising:
    a half-bridge inverter comprising
        a first switch having a high terminal and a low terminal, and a control terminal, wherein the high terminal of the first switch is connected to the power rail of the DC power source,
        a second switch having a high terminal, a low terminal, and a control terminal, wherein the low terminal of the second switch is connected to the ground of the DC power source,
        the high terminal of the second switch is connected to the low terminal of the first switch at an inverter output node;
    a resonant tank circuit comprising
        one resonant capacitor having a first end and a second end, the second end of the resonant capacitor connected directly to the ground of the DC power source, and
        one resonant inductor having a first end connected directly to the inverter output node and a second end connected directly to the first end of the resonant capacitor;
    a first clamping diode having an anode connected to a junction between the resonant inductor and the resonant capacitor and a cathode connected to the power rail of the DC power source;
    a second clamping diode having an anode connected to the ground of the DC power source and a cathode connected to the junction between the resonant capacitor and the resonant inductor;
    an isolating transformer connected to the output of the resonant tank circuit, the isolating transformer comprising a primary winding connected on a first end to a node between the resonant inductor and the resonant capacitor and on a second end to the ground of the DC power source;
    an output rectifier having an input connected to a secondary winding of the isolating transformer and an output configured to connect to the light source; and
    a controller connected to a dimming circuit and configured to receive a dimming signal from the dimming circuit, and configured to
        sense a current provided to the light source from the output rectifier, and
        control the current provided to the light source as a function of the sensed current and the received dimming signal by adjusting a switching frequency of the half-bridge inverter.

10. The driver circuit of claim 9, further comprising:
    a circuit ground, wherein the circuit ground is isolated from the ground of the DC power source;
    a current sensing resistor having a first terminal connected to the circuit ground and a second terminal operable to connect to the light source, wherein a voltage across the current sensing resistor is proportional to a current through the light source; and
    wherein the controller is connected to the circuit ground and the second terminal of the current sensing resistor to monitor the voltage across the current sensing resistor and sense the current provided to the light source.

11. The driver circuit of claim 9, wherein:
    the resonant tank circuit further comprises a DC blocking capacitor connected between the output of the resonant tank circuit and the junction between the resonant inductor and the resonant capacitor;
    the driver circuit further comprises an output capacitor connected between an output of the output rectifier and the circuit ground; and
    the output capacitor is operable to stabilize a voltage provided to the light source by the driver circuit.

12. The driver circuit of claim 9, wherein:
    the first and second clamping diodes are effective to limit the voltage across the resonant capacitor and at the junction between the resonant inductor and the resonant capacitor to a maximum of a voltage of the power rail of the DC power source and a minimum of a voltage of the ground of the DC power source.

13. The driver circuit of claim 12, wherein:
    a turns ratio of the isolating transformer is selected as a function of a voltage of the power rail of the DC power source and a predetermined output voltage limit.

14. A driver circuit operable to provide current to a light source from a direct current (DC) power source having a power rail and a ground, the driver circuit comprising:
    a half-bridge inverter comprising a first switch coupled in series with a second switch between the power rail and the ground, and configured to provide an alternating current (AC) signal corresponding to a switching frequency of the first and second switches at an inverter output node between the first and second switches;
    one resonant capacitor having a first end and a second end, the second end of the resonant capacitor connected directly to the ground of the DC power source;
    one resonant inductor having a first end connected directly to the inverter output node and a second end connected directly to the first end of the resonant capacitor;
    an isolating transformer comprising a primary winding connected on a first end to a node between the resonant inductor and the resonant capacitor and on a second end to the ground of the DC power source; and
    a clamping circuit connected to the node between the resonant inductor and the resonant capacitor, and configured to limit the voltage at the node between the resonant inductor and the resonant capacitor to a maximum of a voltage of the power rail of the DC power source and a minimum of a voltage of the ground of the DC power source;
    an output rectifier having an input connected to a secondary winding of the isolating transformer and an output operable to connect to the light source; and
    a controller connected to a dimming circuit and configured to
        receive a dimming signal from the dimming circuit,
        sense a current provided to the light source from the output rectifier, and
        adjust a switching frequency of the half-bridge inverter as a function of the sensed current and the received dimming signal to maintain the sensed current at a target current associated with the received dimming signal, wherein soft-switching operation of the half-bridge inverter is guaranteed by the limited voltage across the resonant capacitor.

15. The driver circuit of claim 14, further comprising:

a circuit ground, wherein the circuit ground is isolated from the ground of the DC power source;

a current sensing resistor having a first terminal connected to the circuit ground and a second terminal operable to connect to the light source, wherein a voltage across the current sensing resistor is proportional to a current through the light source; and wherein the controller is connected to the circuit ground and the second terminal of the current sensing resistor to monitor the voltage across the current sensing resistor and sense the current provided to the light source.

16. The driver circuit of claim 14, further comprising a DC blocking capacitor coupled in series with the primary winding of the isolating transformer, the DC blocking capacitor and the primary winding coupled in parallel with the one resonant capacitor.

17. The driver circuit of claim 14, wherein the dimming circuit is interfaced with an external dimmer to receive an external reference signal.

18. The driver circuit of claim 14, wherein a turns ratio of the isolating transformer is selected as a function of a voltage of the power rail of the DC power source and a predetermined output voltage limit.

* * * * *